(12) United States Patent
Kang

(10) Patent No.: US 11,893,702 B2
(45) Date of Patent: Feb. 6, 2024

(54) VIRTUAL OBJECT PROCESSING METHOD AND APPARATUS, AND STORAGE MEDIUM AND ELECTRONIC DEVICE

(71) Applicant: GUANGDONG OPPO MOBILE TELECOMMUNICATIONS CORP., LTD., Dongguan (CN)

(72) Inventor: Jian Kang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 115 days.

(21) Appl. No.: 17/586,617

(22) Filed: Jan. 27, 2022

(65) Prior Publication Data

US 2022/0148279 A1 May 12, 2022

Related U.S. Application Data

(63) Continuation of application No. PCT/CN2020/105578, filed on Jul. 29, 2020.

(30) Foreign Application Priority Data

Jul. 30, 2019 (CN) .......................... 201910695983.8

(51) Int. Cl.
*G06T 19/20* (2011.01)
*G06T 19/00* (2011.01)

(52) U.S. Cl.
CPC ............ *G06T 19/20* (2013.01); *G06T 19/006* (2013.01); *G06T 2219/2004* (2013.01)

(58) Field of Classification Search
None
See application file for complete search history.

(56) References Cited

U.S. PATENT DOCUMENTS 10,169,917 B2   1/2019  Chen et al.
11,120,639 B1 *  9/2021  Smith ................... G06F 3/011
(Continued)

FOREIGN PATENT DOCUMENTS

CN  106200944 A  12/2016
CN  106997281 A   8/2017
(Continued)

OTHER PUBLICATIONS

International Search Report and Written Opinion dated Oct. 30, 2020 in International Application No. PCT/CN2020/105578. English translation attached.
(Continued)

*Primary Examiner* — Robert J Craddock
(74) *Attorney, Agent, or Firm* — Sheppard, Mullin, Richter & Hampton LLP

(57) ABSTRACT

Provided is a virtual object processing method. The virtual object processing method includes: detecting a spatial plane in a scene where a first device is located; detecting real objects in the scene to determine a plurality of real object position boxes; determining, based on a matching relation between the plurality of real object position boxes and the spatial plane in the scene, a candidate position box set from the plurality of real object position boxes; determining, in response to a virtual object configuration operation for a target position box in the candidate position box set, position information of the virtual object in the target position box; transmitting position on the virtual object and the position information of the virtual object in the target position box to a second device for displaying the virtual object on the second device.

20 Claims, 8 Drawing Sheets

(56) References Cited

U.S. PATENT DOCUMENTS

2015/0097865 A1     4/2015   Subramanian et al.
2016/0292925 A1    10/2016   Montgomerie et al.

FOREIGN PATENT DOCUMENTS

| | | |
|---|---|---|
| CN | 107393017 A | 11/2017 |
| CN | 108830894 A | 11/2018 |
| CN | 109521869 A | 3/2019 |
| CN | 109754471 A | 5/2019 |
| CN | 109847361 A | 6/2019 |
| CN | 109903129 A | 6/2019 |
| CN | 109992108 A | 7/2019 |
| CN | 110473293 A | 11/2019 |
| WO | 2018234866 A2 | 12/2018 |
| WO | 2019020022 A1 | 1/2019 |
| WO | 2019105190 A1 | 6/2019 |

OTHER PUBLICATIONS

First Office Action from corresponding Chinese Application No. 201910695983.8, dated Oct. 19, 2022. English translation attached.
Deng et al., "An Augmented Reality Method Based on Plane Structures", Journal of Engineering Graphics, No. 1, Institute of Logistics Science, issued date Feb. 15, 2008. English Abstract Only.
Extended European Search Report dated Sep. 27, 2022 received in European Patent Application No. EP 20845989.1.
Kim et al., "Augmented-Reality Survey: from Concept to Application", Ksiitransactions on Internet and Information Systems, vol. 11, No. 2, Feb. 28, 2017 (Feb. 28, 2017), pp. 982-1004, XP055961765.

\* cited by examiner

VIRTUAL OBJECT PROCESSING METHOD AND APPARATUS, AND STORAGE MEDIUM AND ELECTRONIC DEVICE

CROSS-REFERENCE TO RELATED APPLICATIONS

The present application is a continuation of International Application No. PCT/CN2020/105578 filed on Jul. 29, 2020, which claims priority to the Chinese patent application No. 201910695983.8 entitled "VIRTUAL OBJECT PROCESSING METHOD AND APPARATUS, STORAGE MEDIUM AND ELECTRONIC DEVICE" filed on Jul. 30, 2019, which is incorporated herein by reference in its entirety.

FIELD

The present disclosure relates to the field of augmented reality technology, and more particularly, to a virtual object processing method, a virtual object processing apparatus, a storage medium, and an electronic device.

BACKGROUND

Augmented Reality (AR) is a technology that integrates a virtual world and a real world, which has been applied to many fields such as education, games, medical care, the Internet of Things, and intelligent manufacturing. With the continuous improvement of the performance of mobile devices and the rapid development of AR technology, the realization of AR applications on mobile devices has a broad market prospect. In particular, by use of multi-person AR technology, AR interaction between multiple users can be realized.

However, on one hand, the current multi-person AR technology requires multiple users to be in the same environment or uses the same visual information as the basis for interaction, which limits the range of application of AR technology. On the other hand, manual labeling apparatuses or auxiliary devices are required to be arranged, which leads to a high cost and affects the convenience of AR interaction.

SUMMARY

The present disclosure aims to provide a virtual object processing method, a virtual object processing apparatus, a storage medium, and an electronic device, so as to overcome at least to a certain extent the problem of limiting the range of application of multi-person AR due to the need for the same environment.

According to a first aspect of the present disclosure, a virtual object processing method is provided. The method includes: detecting a spatial plane in a scene where a first device is located; detecting real objects in the scene to determine a plurality of real object position boxes; determining a candidate position box set from the plurality of real object position boxes based on a matching relation between the plurality of real object position boxes and the spatial plane in the scene; determining, in response to a virtual object configuration operation for a target position box in the candidate position box set, position information of a virtual object in the target position box; and transmitting information on the virtual object and the position information of the virtual object in the target position box to a second device for displaying the virtual object on the second device.

According to a second aspect of the present disclosure, a virtual object processing method is further provided. The method includes: detecting a spatial plane in a scene where a second device is located; detecting real objects in the scene to determine a plurality of real object position boxes; determining a candidate position box set from the plurality of real object position boxes based on a matching relation between the plurality of real object position boxes and the spatial plane in the scene; obtaining information on a virtual object and position information of the virtual object in a target position box of a first device that are transmitted by the first device; determining, in response to a virtual object configuration operation, a virtual object placement box from the candidate position box set; and determining, based on the position information of the virtual object in the target position box of the first device, position information of the virtual object in the virtual object placement box for displaying the virtual object on the second device.

According to a third aspect of the present disclosure, a virtual object processing apparatus is provided. The apparatus includes: a first plane detection module configured to detect a spatial plane in a scene where a first device is located; a first position box determination module configured to detect real objects in the scene to determine a plurality of real object position boxes; a first position box set determination module configured to determine a candidate position box set from the plurality of real object position boxes based on a matching relation between the plurality of real object position boxes and the spatial plane in the scene; an object position determination module configured to determine position information of a virtual object in the target position box in response to a virtual object configuration operation for a target position box in the candidate position box set; and an information transmission module configured to transmit information on the virtual object and the position information of the virtual object in the target position box to a second device to for displaying the virtual object on the second device.

According to a fourth aspect of the present disclosure, a virtual object processing apparatus is provided. The apparatus includes: a second plane detection module configured to detect a spatial plane in a scene where a second device is located; a second position box determination module configured to detect real objects in the scene to determine a plurality of real object position boxes; a second position box set determination module configured to determine a candidate position box set from the plurality of real object position boxes based on a matching relation between the plurality of real object position boxes and the spatial plane in the scene; an information obtaining module configured to obtain information on a virtual object and position information of the virtual object in a target position box of a first device that are transmitted by the first device; a placement box determination module configured to determine a virtual object placement box from the candidate position box set in response to a virtual object configuration operation; and a position conversion module configured to determine position information of the virtual object in the virtual object placement box based on the position information of the virtual object in the target position box of the first device for displaying the virtual object on the second device.

According to a fifth aspect of the present disclosure, a storage medium is provided. The storage medium stores a computer program, and the computer program, when executed by a processor, implements the virtual object processing method of any one of the above aspects.

According to a sixth aspect of the present disclosure, an electronic device is provided. The electronic device includes: a processor; and a memory configured to store executable instructions of the processor; where the processor is configured to execute the executable instructions to perform the virtual object processing method of any one of the foregoing aspects.

BRIEF DESCRIPTION OF DRAWINGS

The figures herein are incorporated into the specification and constitute a part of the specification, show embodiments in consistent with the disclosure, and are used to explain the principle of the disclosure together with the specification. Obviously, the figures in the following description are only some embodiments of the present disclosure, and other figures can be obtained by those of ordinary skills in the art based on these figures without creative effort. In the accompanying figures.

DESCRIPTION OF EMBODIMENTS

Figure 1:
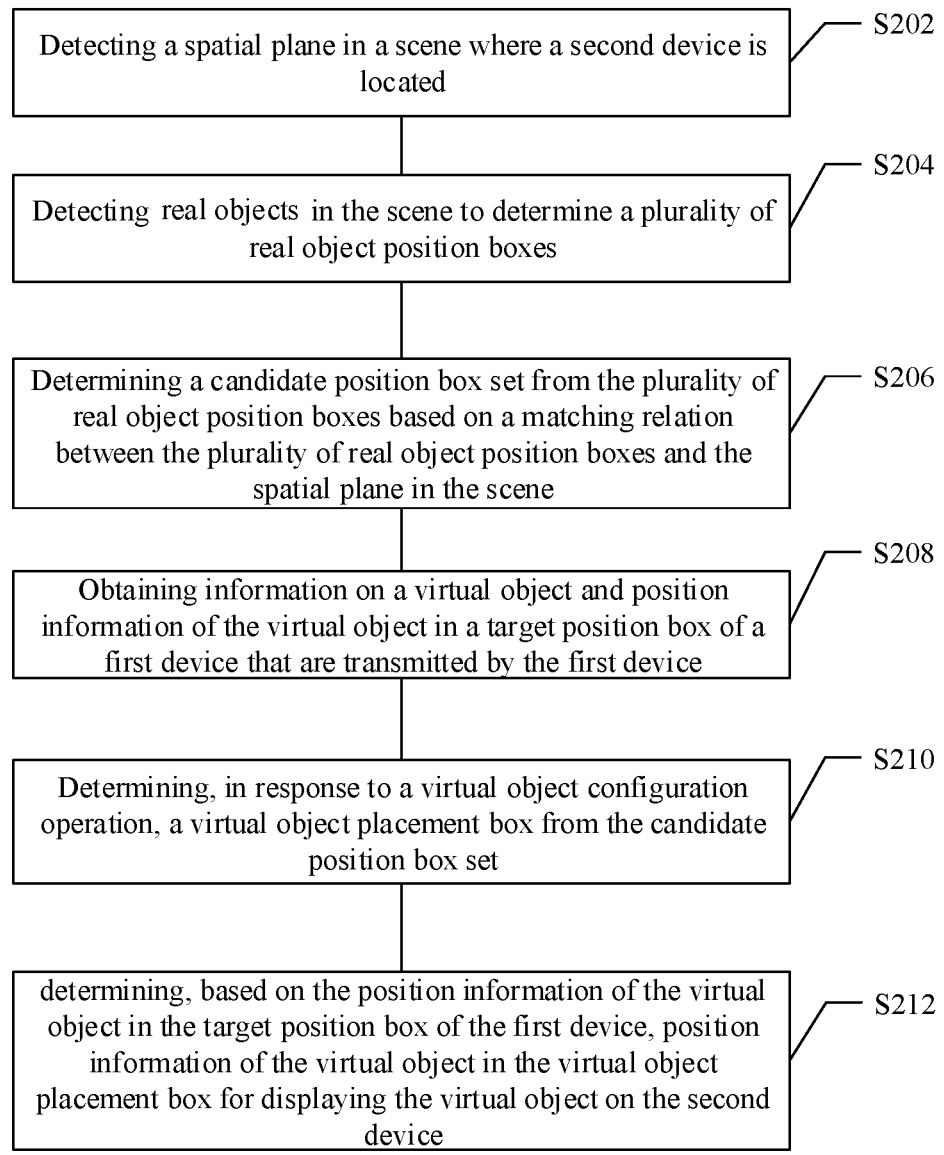
FIG. 1 is a schematic flowchart illustrating a virtual object processing method according to an exemplary embodiment of the present disclosure.

Exemplary embodiments will be described more comprehensively with reference to the accompanying figures. However, the exemplary embodiments can be implemented in various forms, and should not be construed as being limited to the examples set forth herein. On the contrary, the provision of these embodiments makes the present disclosure more comprehensive and complete, and fully conveys the concept of the exemplary embodiments to those skilled in the art. The described features, structures or characteristics can be combined in one or more embodiments in any suitable way. In the following description, many specific details are provided to provide a sufficient understanding of the embodiments of the present disclosure. However, those skilled in the art will realize that the technical solutions of the present disclosure can be practiced without one or more of the specific details, or with other methods, components, apparatuses, steps, etc. In other cases, the well-known technical solutions are not shown or described in detail in order to avoid obscuring respective aspects of the present disclosure.

In addition, the figures are only schematic illustrations of the present disclosure, and are not necessarily drawn to scale. The same reference numerals in the figures denote the same or similar parts, and thus repeated description for them will be omitted. Some of the block diagrams shown in the figures are functional entities and do not necessarily correspond to physically or logically independent entities. These functional entities may be implemented in the form of software, or implemented in one or more hardware modules or integrated circuits, or implemented in different networks and/or processor apparatuses and/or microcontroller apparatuses.

The flowcharts illustrated in the figures are only for an exemplary description, and do not necessarily include all the steps. For example, some steps can be divided, and some steps can be combined or partially combined, so the actual execution order may be changed according to actual conditions. In addition, the terms "first" and "second" are only for the purpose of distinction, and should not be regarded as a limitation of contents of the present disclosure.

In the exemplary embodiments of the present disclosure, the virtual object processing method may be applied to an AR interactive scene of multiple persons in different locations. Multiple users located in different locations can use data collected by their electronic devices to reconstruct a scene environment and detect a plane area based on Simultaneous Localization And Mapping (SLAM) technology. Next, one user may place a virtual object in an area in a plane, and transmit position information of the virtual object to an electronic device used by other user. After receiving the virtual object and the corresponding position of the virtual object, the electronic device used by the other user can select an area in his respective scene to place the virtual object, determine a respective position of the virtual object in the placement area based on the received corresponding position of the virtual object, display the virtual object, and perform subsequent interaction operations on the virtual object.

In the process of the virtual object processing method described in the present disclosure, it is not required that respective users must be in the same scene, and a manual identification apparatus for the AR interaction is not required.

Terminal devices that execute the virtual object processing method such as a first device, a second device, and an electronic device described in the present disclosure may include, but are not limited to, mobile phones, tablet computers, smart wearable devices, and the like.

In addition, the virtual object processing process described below can be integrated into an application (APP), and when a user starts the APP, the display and interaction process of the virtual object can be realized.

The virtual object processing method according to the exemplary embodiments of the present disclosure will be described in detail below.

FIG. 1 is a schematic flowchart illustrating a virtual object processing method according to an exemplary embodiment of the present disclosure. The method illustrated in FIG. 1 can be implemented by a first device, where the first device is a device that initially configures a virtual object. That is, after configuring the virtual object, the first device may transmit the virtual object and its position to another device. Correspondingly, a second device can be a device that receives information on the virtual object. In some scenarios, the first device can be an initiator of a multi-person AR interaction. It is easy to understand that in other instances, the second device may also be an initiator of a multi-person AR interaction. That is, an electronic device can be a device that initially configures a virtual object or a device that receives information on a virtual object, or a device that initially configures a virtual object and receives information on another virtual object.

Referring to FIG. 1, the virtual object processing method may include the following steps.

At 102, a spatial plane in a scene where a first device is located is detected.

In an exemplary embodiment of the present disclosure, first, the first device can collect a plurality of video frame images for the scene, and inertial information corresponding to the images. The video frame image may be visual information collected by a camera of the first device. The inertial information may be obtained by means of an Inertial Measurement Unit (IMU) device of the first device. The IMU device may include a gyroscope and an accelerometer, which can measure an angular velocity and an acceleration of a terminal device respectively. Since the operating frequency of the IMU device is usually higher than the frequency at which the camera collects images, the IMU pre-integration method can be used to evaluate the inertial information of the corresponding frame. The IMU pre-integration is a time-based integration, and can be used to obtain the inertial information such as the position, speed, and rotation angle corresponding to two images.

In this case, based on the plurality of video frame images and the corresponding inertial information that are collected by the first device, and in combination with Visual-Inertial SLAM (VI-SLAM), poses of respective video frame images and three Dimension (3D) positions of sparse or semi-dense feature points in the scene can be obtained.

Next, a feature point cloud composed of feature points can be obtained. Considering that the purpose of constructing the feature point cloud in the present disclosure is mainly for plane detection, and based on the processing capability of an electronic device such as a mobile phone, the feature point cloud in the present disclosure is usually a sparse feature point cloud in order to facilitate calculation and fast processing. However, it is easy to understand that each of a semi-dense feature point cloud and a dense feature point cloud can alternatively be used as the feature point cloud constructed in the present disclosure.

Subsequently, the constructed feature point cloud can be used to detect a spatial plane in the scene. For example, the feature point cloud can be divided into triangular facets, normal vectors of respective triangular facets can be determined, a clustering may be performed on respective normal vectors, and then a spatial plane in the scene can be determined based on the result of clustering. For another example, a 3D Hough plane detection algorithm can be used to detect the feature point cloud to determine a spatial plane in the scene where the first device is located. The specific process of detecting the spatial plane is not particularly limited in this exemplary embodiment.

It should be noted that there may be one or more detected spatial planes, the number of which is related to the specific scene. In addition, the spatial plane can be represented by a normal vector or a coordinate point in the plane.

At 104, real objects in the scene are detected to determine a plurality of real object position boxes.

According to some embodiments of the present disclosure, first, in the case that the feature point cloud of the scene where the first device is located has been determined, a current frame image taken by the first device can be obtained and used as a target frame image. Next, the target frame image can be input into a trained machine learning model, and the trained machine learning model can be used to determine a plurality of real object position boxes.

On one hand, the machine learning model used in the present disclosure is a deep learning model for target detection, for example a MobileNet model. The present disclosure does not impose special restrictions on the network structure and training process of the model. In addition, those skilled in the art can determine that other models can also be used to achieve target detection. For example, any of some convolutional neural networks that output multiple classification results can be used as the machine learning model described in the present disclosure. However, the solutions of applying this processing means to the virtual object processing method of the present disclosure all belong to the concept of the present disclosure.

On the other hand, the position box described in the present disclosure is usually a rectangular box. In this case, the determined position box can be regarded as a 2D rectangular bounding box (2D box). However, the position box can also be in another shape, such as a triangular, circular, other polygonal shape, etc., which is not particularly limited in this exemplary embodiment.

In addition, the real object position box described in the present disclosure refers to a position box containing a real object. The real object may be an object including a plane and actually existing in the scene, such as a table, a coffee table, a TV, a chair, and so on.

At 106, based on a matching relation between the plurality of real object position boxes and the spatial plane in the scene, a candidate position box set is determined from the plurality of real object position boxes.

After the plurality of real object position boxes are determined at step 104, a matching relation between the plurality of real object position boxes and the spatial plane in the scene can be determined at step 106.

Specifically, for each determined real object position box, a plurality of feature position points of the real object position box can be determined first. Taking a rectangular position box as an example, the feature position points may be position points (or called coordinate points) corresponding to four corners of the rectangular box. It is easy to understand that for a triangular box, the feature position points described herein may refer to the position points corresponding to three corners of the triangular box.

Next, the plurality of feature position points can be converted onto a coordinate system of the feature point cloud. Since the real object position box is a two-dimensional box, it is necessary to map the two-dimensional coordinates of the plurality of feature position points onto a three-dimensional coordinate system of the feature point cloud, so as to determine the coordinate points in the coordinate system of the feature point cloud.

Subsequently, in the three-dimensional coordinate system of the feature point cloud, normal directions of the plurality of feature position points of the real object position box are determined. Specifically, a plane of the real object position box in the three-dimensional coordinate system of the feature point cloud is determined, and a direction perpendicular to the plane is determined as a normal direction of the real object position box. and in this case, the normal direction can be used as the normal direction of each of the plurality of feature position points of the real object position box.

Then, it is determined in the three-dimensional coordinate system of the feature point cloud, whether projections of respective feature position points of a real object position box along the respective normal directions are all on a same spatial plane. When they are all on the same spatial plane, the real object position box is determined as a candidate position box, and the real object position box is added to the candidate position box set. At this time, it can be determined that the real object position box matches the spatial plane.

In addition, when the corresponding projections cannot satisfy the condition of being on a same spatial plane, it can be determined that the real object position box does not match the spatial plane.

It should be noted that the determined candidate position box set usually includes a plurality of candidate position boxes. However, in some other embodiments of the present disclosure, the candidate position box set may include only one candidate position box.

At 108, in response to a virtual object configuration operation for a target position box in the candidate position box set, position information of a virtual object in the target position box is determined.

The virtual object described in the present disclosure may be an object used for AR interaction. The virtual object is related to a specific AR scene. For example, it may be a leather ball, a chess piece of a board game, a presentation interface, a cartoon character, etc. The type of the virtual object is not specifically limited in the present disclosure.

In an exemplary embodiment of the present disclosure, the candidate position box in the candidate position box set may be displayed on a screen of the first device for selection by a user. However, the candidate position box in the candidate position box set may alternatively not be displayed, the user can determine a possible position for placing the virtual object based on his own vision. In this case, only when the position determined by the user is same as the position of a candidate position box in the determined candidate position box set, the first device can make a response.

The user can perform a virtual object configuration operation on a target position box in the candidate position box set. For example, the user can click on one candidate position box. In addition, when there are a plurality of alternative virtual objects, the user can select one virtual object for configuration.

It is easy to understand that when there is only one candidate position box in the candidate position box set, the candidate position box is the target position box.

The position of a touch point where the user clicks the target position frame can be determined as the position of the virtual object in the target position box. Those skilled in the art can understand that the user click operation described in the present disclosure may include a short press, a long press and other operations.

In addition, the position information of the virtual object in the target position box may be characterized by, for example, a center coordinate point of the virtual object. After determining the position information of the virtual object in the target position box, based on the position information, a three-dimensional position information of the virtual object in the scene (the feature point cloud) can be determined, and the virtual object can be displayed on the first device based on the three-dimensional position information.

At 110, information on the virtual object and the position information of the virtual object in the target position box are transmitted to a second device for displaying the virtual object on the second device.

In an exemplary embodiment of the present disclosure, the first device may transmit information on the virtual object and the position information of the virtual object in the target position box to a second device. The information on the virtual object may be information that uniquely identifies the virtual object, or may be information that describes the virtual object. That is, the second device can uniquely and indiscriminately determine the virtual object based on the information on the virtual object to display the virtual object.

The display position of the virtual object in the second device is related to the position information of the virtual object in the target position box of the first device. That is, based on the position information of the virtual object in the target position box of the first device in combination with a user operation on the second device, the position of the virtual object in the second device can be determined.

In addition, it should be noted that the first device can also transmit the information on the virtual object and the position information of the virtual object in the target position box to other devices besides the second device, so as to realize AR interaction among more than two devices.

A virtual object processing method for the second device will be described below.

Figure 2:
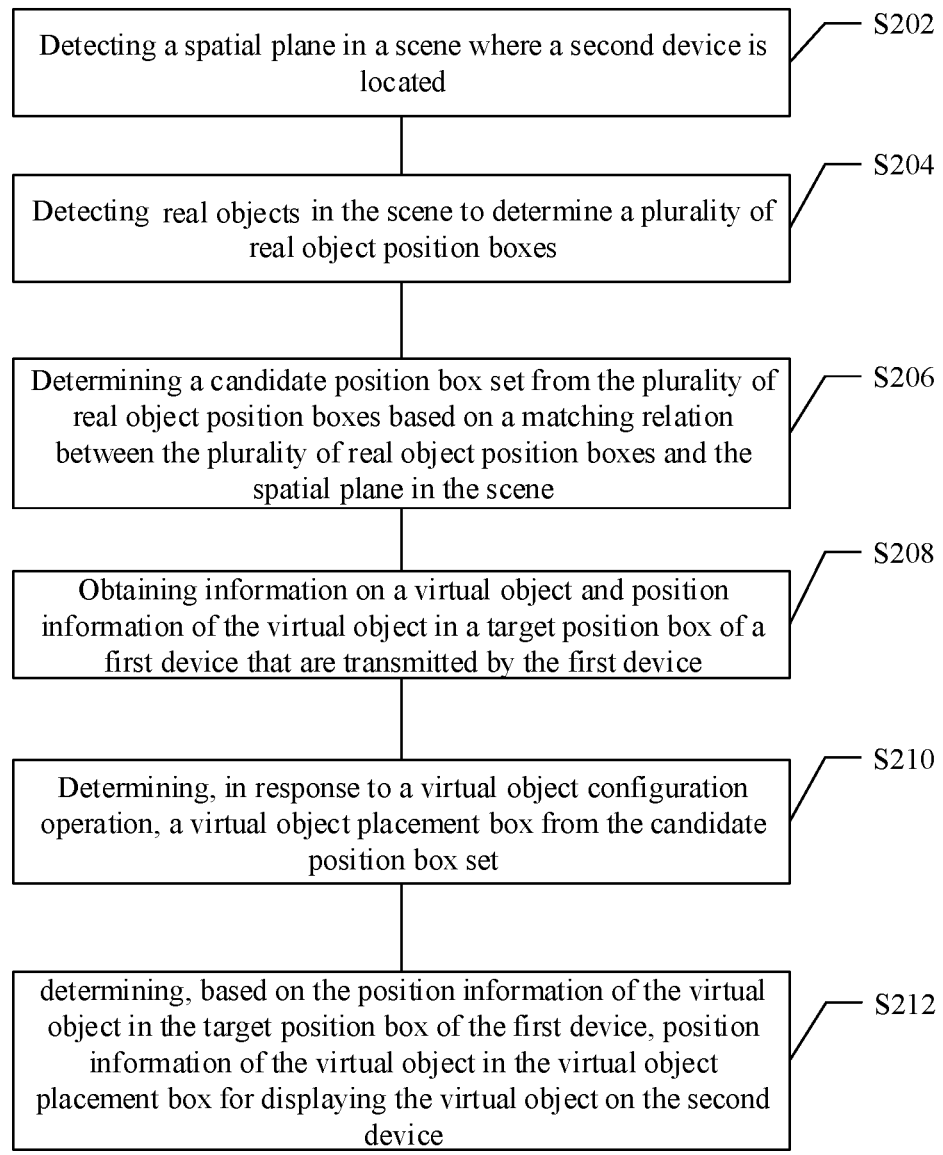
FIG. 2 is a schematic flowchart illustrating a virtual object processing method according to another exemplary embodiment of the present disclosure.

FIG. 2 is a schematic flowchart illustrating a virtual object processing method according to another exemplary embodiment of the present disclosure. The method illustrated in FIG. 2 can be implemented by the second device.

Referring to FIG. 2, the virtual object processing method corresponding to the second device may include the following steps.

At 202, a spatial plane in a scene where a second device is located is detected.

First, feature points of the scene where the second device is located are extracted based on a plurality of video frame images and corresponding inertial information that are collected by the second device. Next, a feature point cloud is constructed based on the extracted feature points. Then, the spatial plane in the scene where the second device is located is detected by use of the feature point cloud.

The specific process is similar to the process of step 102, and details thereof will be omitted here.

At 204, real objects in the scene are detected to determine a plurality of real object position boxes.

A current frame image taken by the second device can be used as a target frame image. The target frame image is input into a trained machine learning model. The plurality of real object position boxes are determined by use of the trained machine learning model.

The specific process is similar to the process of step 104, and details thereof will be omitted here.

At 206, based on a matching relation between the plurality of real object position boxes and the spatial plane in the scene, a candidate position box set is determined from the plurality of real object position boxes.

First, for any one real object position box of the plurality of real object position boxes, a plurality of feature position points of the real object position box are determined. Next, coordinate points and normal directions of the plurality of feature position points in a coordinate system of the feature point cloud of the scene where the second device is located are determined. When projections of the coordinate points of the plurality of feature position points in the coordinate system of the feature point cloud of the scene where the second device is located along the respective normal directions are all on a same spatial plane, the real object position box is determined as a candidate position box, and the real object position box is added to the candidate position box set.

The specific process is similar to the process of step 106, and details thereof will be omitted here.

At 208, information on a virtual object and position information of the virtual object in a target position box of a first device that are transmitted by the first device are obtained.

During the AR interaction between the second device and the first device, the second device can obtain information on a virtual object and the position information of the virtual object in the target position box of the first device that are transmitted by the first device.

At 210, in response to a virtual object configuration operation, a virtual object placement box is determined from the candidate position box set.

The user of the second device may determine a position box from the candidate position box set as a virtual object placement box. Similarly, a candidate position box in the candidate position box set can be displayed on the second device for selection by the user.

In addition, the method of the present disclosure may alternatively perform step 210 first, and then perform step 208.

At 212, based on the position information of the virtual object in the target position box of the first device, position information of the virtual object in the virtual object placement box is determined for displaying the virtual object on the second device.

In an exemplary embodiment of the present disclosure, a size ratio between the target position box and the virtual object placement box may be determined first. For example, when the size of the target position box transmitted by the first device is 10*10 and the size of the virtual object placement box in the second device is 5*5, the size ratio is 2:1.

Next, the second device may perform a zooming processing on the position information of the virtual object in the target position box of the first device based on the size ratio, and determine the result of the zooming processing as the position information of the virtual object in the virtual object placement box. That is, if the virtual object is in the exact center of the target position box, the virtual object is also in the exact center of the virtual object placement box. For other situations, the position of the virtual object in the virtual object placement box can be determined according to an equal proportional zooming process of the two-dimensional coordinate system. Taking a rectangular box as an example, any one of the four corners can be used as the coordinate origin to construct a rectangular coordinate system, so as to determine a specific position of the virtual object in the virtual object placement box by use of the rectangular coordinate system. It should be noted that the zooming processing is only for position information, and the size of the virtual object usually does not change.

Figure 3:
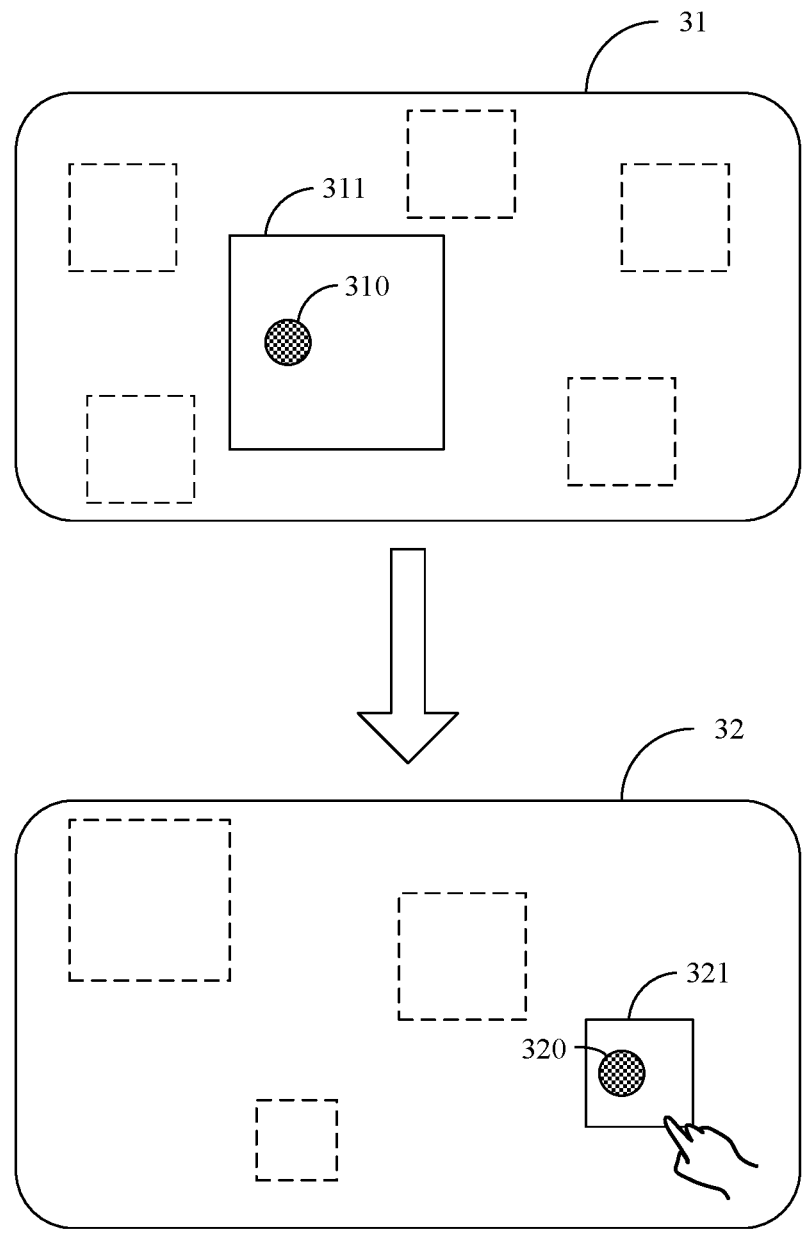
FIG. 3 is a schematic diagram showing a second device determining a position of a virtual object in a virtual object placement box.

Referring to FIG. 3, the first device 31 may determine a plurality of candidate position boxes. As shown in the figure, each candidate position box is a rectangular box. A user of the first device 31 determines a target position box 311, and a position of the virtual object in the first device 31 is a position 310. The first device 31 transmits the position information of the position 310 in the target position box 311 to the second device 32.

A user of the second device 32 selects a virtual object placement box 321 from a plurality of candidate position boxes. Corresponding to the position information of the position 310 in the target position box 311, the virtual object can be placed at a position 320 of the virtual object placement box 321. The position of the position 310 in the target position box 311 is consistent with the position of the position 320 in the virtual object placement box 321.

Subsequent to determining the position information of the virtual object in the virtual object placement box, the second device can determine three-dimensional position information of the virtual object in the scene where the second device is located based on the position information. Based on the three-dimensional position information of the virtual object in the scene, the virtual object can be displayed on the second device.

In addition, subsequent to displaying the virtual object, the second device can transmit data of the interaction operation to the first device in response to an interaction operation of the user of the second device on the virtual object. In this case, the first device can display an image corresponding to the interaction operation. For example, the user of the second device may use AR interaction means (for example, by means of gestures) to rotate the virtual object, and the virtual object will present a rotating effect on the first device.

Figure 4:
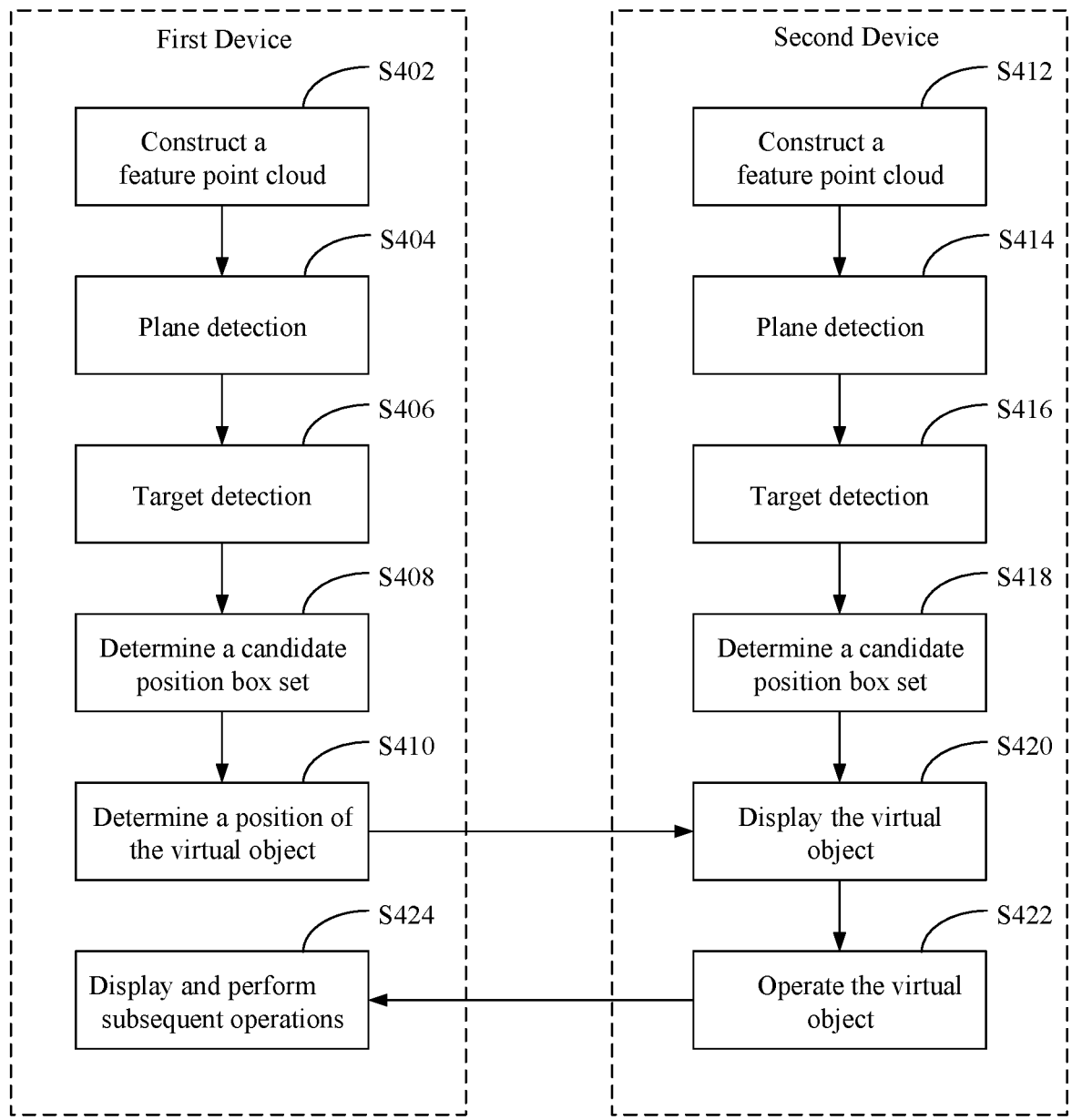
FIG. 4 is a schematic flowchart illustrating AR data processing performed by a first device and a second device.

A processing procedure of an exemplary virtual object processing method of the present disclosure will be described below with reference to FIG. 4.

For a first device: at step 402, collected visual information and inertial information can be used to construct a sparse feature point cloud; at step 404, a spatial plane in a scene can be detected based on the constructed sparse feature point cloud; at step 406, a target detection is performed on the scene to determine a plurality of real object position boxes; at step 408, a candidate position box set is determined based on a matching relation between the plurality of real object position boxes and the spatial plane in the scene; and at step 410, in response to an operation of a user of the first device, a position of a virtual object is determined, and information on the virtual object and position information of the virtual object in a position box are transmitted to a second device.

For a second device, the processes from step 412 to step 418 are similar to the processes from step 402 to step 408, and details thereof will be omitted here. At step 420, based on the position information of the virtual object of the first device in the position box and a user operation of the second device, a display position of the virtual object in the second device is determined, and the virtual object is displayed. At step 422, a user of the second device can perform an operation on the virtual object and transmit data on the operation to the first device.

At step 424, the first device may display the process of the operation of the user of the second device on the virtual object, and may further respond to the operation of the user of the first device to implement AR interaction between the first device and the second device.

With the virtual object processing method described above exemplarily, on one hand, the exemplary method of the present disclosure can realize AR interaction among devices in different environments, which eliminates the limitation brought by the scene and broadens the range of application of multi-person AR technology; on another hand, since the scenes are not required to be the same, it can realize remote or offsite multi-person AR interaction; on another hand, the method of the present disclosure can be directly implemented by a mobile device, without the need for specially configured labeling apparatuses, auxiliary devices and the like for realizing the AR process, which reduces costs; on another hand, the first device and the second device have similar processing procedures in determining the candidate position box set, and the algorithms can be configured in advance and adapted to various mobile devices to implement the AR interaction process among two or more devices.

It should be noted that although the various steps of the method in the present disclosure are described in a specific order in the figures, it does not require or imply that these steps must be performed in the specific order, or that all the steps shown must be performed to achieve the desired result. Additionally or alternatively, some steps may be omitted, multiple steps may be combined into one step for execution, and/or one step may be divided into multiple steps for execution, etc.

Further, an exemplary embodiment further provides a virtual object processing apparatus.

Figure 5:
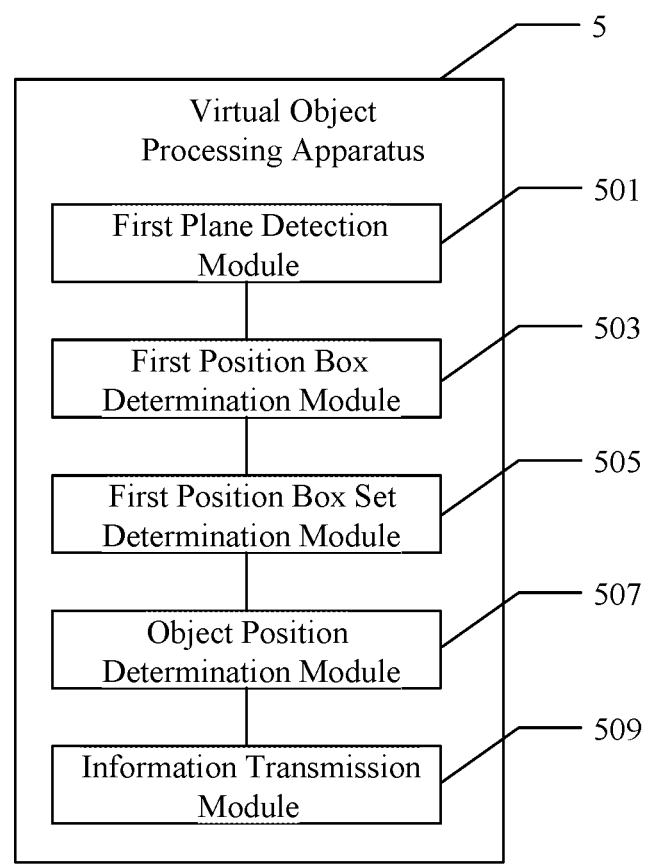
FIG. 5 is a schematic block diagram of a virtual object processing apparatus according to an exemplary embodiment of the present disclosure.

FIG. 5 is a schematic block diagram of a virtual object processing apparatus according to an exemplary embodiment of the present disclosure. Referring to FIG. 5, a virtual object processing apparatus 5 according to an exemplary embodiment of the present disclosure may include a first plane detection module 501, a first position box determination module 503, a first position box set determination module 505, an object position determination module 507, and an information transmission module 509.

Specifically, the first plane detection module 501 may be configured to detect a spatial plane in a scene where a first device is located. The first position box determination module 503 may be configured to detect real objects in the scene to determine a plurality of real object position boxes. The first position box set determination module 505 may be configured to determine a candidate position box set from the plurality of real object position boxes based on a matching relation between the plurality of real object position boxes and the spatial plane in the scene. The object position determination module 507 may be configured to determine position information of a virtual object in the target position box in response to a virtual object configuration operation for a target position box in the candidate position box set. The information transmission module 509 may be configured to transmit the information on the virtual object and the position information of the virtual object in the target position box to a second device for displaying the virtual object on the second device.

According to an exemplary embodiment of the present disclosure, the first plane detection module 501 may be configured to: extract feature points of the scene based on a plurality of video frame images and corresponding inertial information that are collected by the first device; construct a feature point cloud based on the extracted feature points; and detect the spatial plane in the scene where the first device is located by use of the feature point cloud.

According to an exemplary embodiment of the present disclosure, the first position box determination module 503 may be configured to determine a target frame image, input the target frame image into a trained machine learning model, and determine a plurality of real object position boxes by use of the trained machine learning model.

According to an exemplary embodiment of the present disclosure, the first position box set determination module 505 may be configured to: determine, for any one real object position box of the plurality of real object position boxes, a plurality of feature position points of the real object position box; determine coordinate points and normal directions of the plurality of feature position points in a coordinate system of the feature point cloud; and determine the real object position box as a candidate position box and add the real object position box to the candidate position box set, when projections of the coordinate points of the plurality of feature position points in the coordinate system of the feature point cloud along the respective normal directions are all on a same spatial plane.

According to an exemplary embodiment of the present disclosure, the object position determination module 507 may be further configured to: determine, after determining the position information of the virtual object in the target position box, three-dimensional position information of the virtual object in the scene based on the position information of the virtual object in the target position box; and display the virtual object on the first device based on the three-dimensional position information of the virtual object in the scene.

Figure 6:
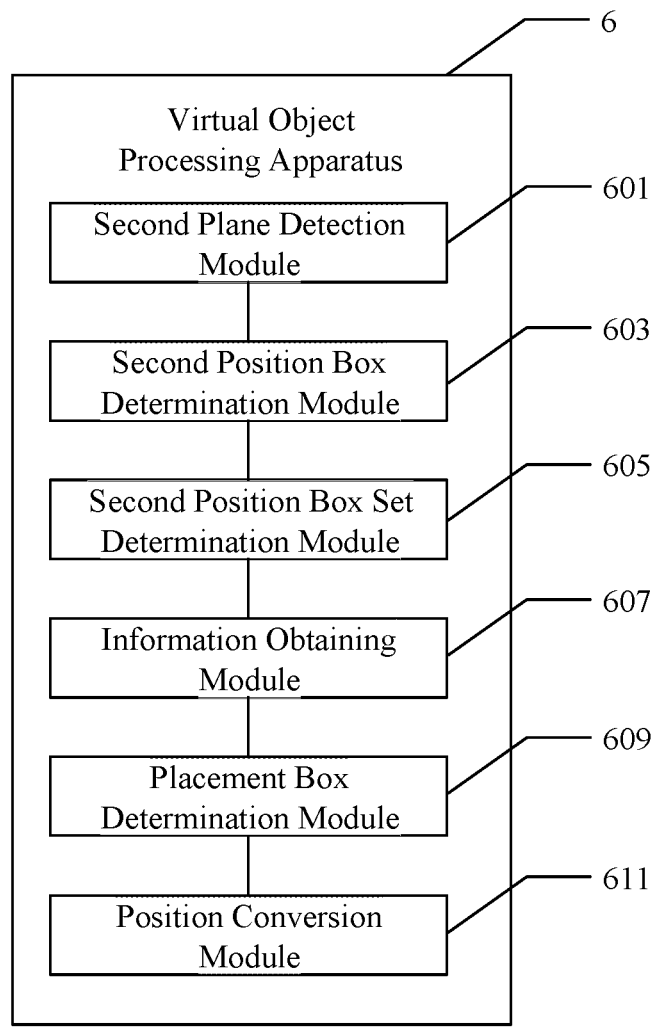
FIG. 6 is a schematic block diagram of a virtual object processing apparatus according to another exemplary embodiment of the present disclosure.

FIG. 6 a schematic block diagram of a virtual object processing apparatus according to another exemplary embodiment of the present disclosure. Referring to FIG. 6, a virtual object processing apparatus 6 according to another exemplary embodiment of the present disclosure may include a second plane detection module 601, a second position box determination module 603, a second position box set determination module 605, an information obtaining module 607, a placement box determination module 609 and a position conversion module 611.

Specifically, the second plane detection module 601 may be configured to detect a spatial plane in a scene where a second device is located. The second position box determination module 603 may be configured to detect real objects in the scene to determine a plurality of real object position boxes. The second position box set determination module 605 may be configured to determine a candidate position box set from the plurality of real object position boxes based on a matching relation between the plurality of real object position boxes and the spatial plane in the scene. The information obtaining module 607 may be configured to obtain information on a virtual object and position information of the virtual object in a target position box of the first device that are transmitted by the first device. The placement box determination module 609 may be configured to determine a virtual object placement box from the candidate position box set in response to a virtual object configuration operation. The position conversion module 611 may be configured to determine position information of the virtual object in the virtual object placement box based on the position information of the virtual object in the target position box of the first device for displaying the virtual object on the second device.

According to an exemplary embodiment of the present disclosure, the second plane detection module 601 may be configured to: extract feature points of the scene based on a plurality of video frame images and corresponding inertial information that are collected by the second device; construct a feature point cloud based on the extracted feature points; and detect the spatial plane in the scene where the second device is located by use of the feature point cloud.

According to an exemplary embodiment of the present disclosure, the second position box determination module 603 may be configured to determine a target frame image, input the target frame image into a trained machine learning model, and determine a plurality of real object position boxes by use of the trained machine learning model.

According to an exemplary embodiment of the present disclosure, the second position box set determination module 605 may be configured to determine, for any one real object position box in the plurality of real object position boxes, a plurality of feature position points of the real object position box; determine coordinate points and normal directions of the plurality of feature position points in a coordinate system of the feature point cloud; and determine the real object position box as a candidate position box and add the real object position box to the candidate position box set, when projections of the coordinate points of the plurality of feature position points in the coordinate system of the feature point cloud along the respective normal directions are all on a same spatial plane.

According to an exemplary embodiment of the present disclosure, the position conversion module 611 may be configured to determine a size ratio between the target position box and the virtual object placement box; perform a zooming processing on the position information of the virtual object in the target position box of the first device based on the size ratio, and determine a result of the zooming processing as the position information of the virtual object in the virtual object placement box.

According to an exemplary embodiment of the present disclosure, the position conversion module 611 may be further configured to determine three-dimensional position information of the virtual object in the scene based on the position information of the virtual object in the virtual object placement box; and display the virtual object on the second device based on the three-dimensional position information of the virtual object in the scene.

Figure 7:
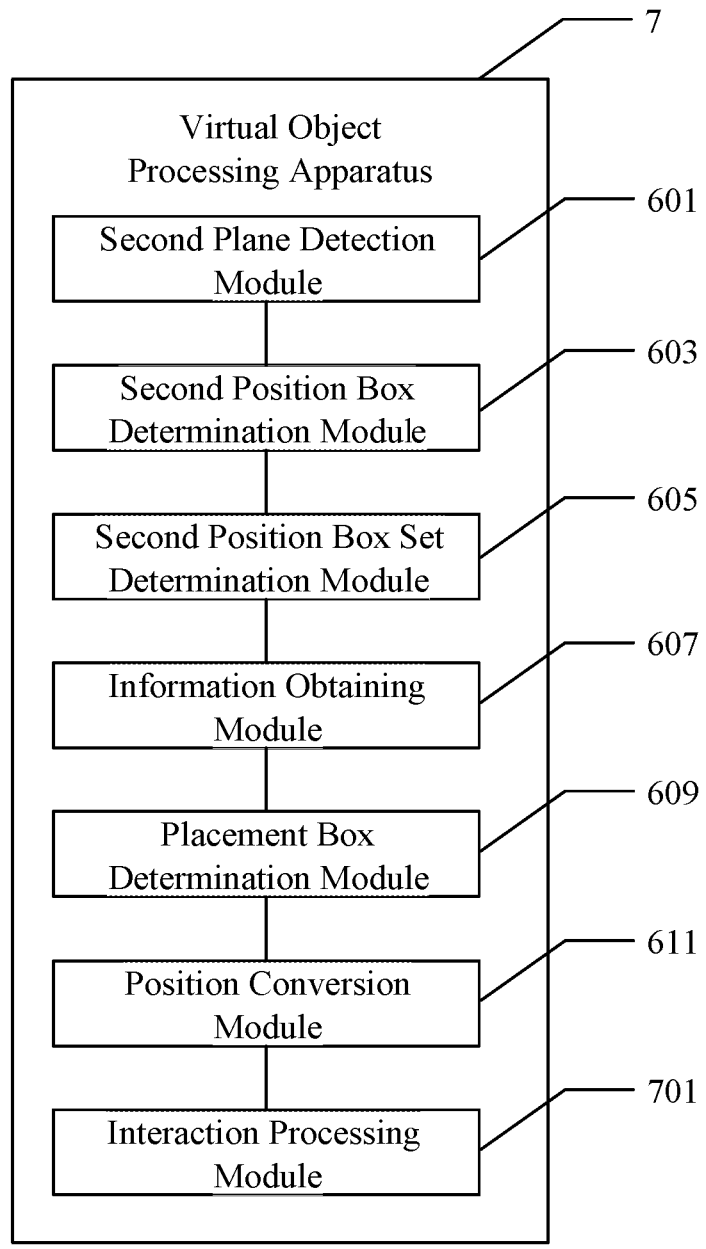
FIG. 7 is a schematic block diagram of a virtual object processing apparatus according to still another exemplary embodiment of the present disclosure.

According to an exemplary embodiment of the present disclosure, referring to FIG. 7, compared with the virtual object processing apparatus 6, the virtual object processing apparatus 7 may further include an interaction processing module 701.

Specifically, the interaction processing module 701 may be configured to transmit, after displaying the virtual object on the second device, in response to an interaction operation on the virtual object, data on the interaction operation to the first device for displaying an image corresponding to the interaction operation on the first device.

Since various functional modules of the virtual object processing apparatus in the embodiment of the present disclosure are the same as those in the above-mentioned method in the disclosed embodiment, details thereof will be omitted here.

In an exemplary embodiment of the present disclosure, a computer-readable storage medium is also provided. The computer-readable storage medium stores a program product capable of implementing any of the above-mentioned methods in this specification. In some possible embodiments, various aspects of the present disclosure may also be implemented in the form of a program product which includes program codes. The program codes are configured to, when the program product runs on a terminal device, cause the terminal device to perform the steps of the "exemplary method" described above in this specification according to various exemplary embodiments of the present disclosure.

The program product for implementing the above method according to the embodiment of the present disclosure may adopt a portable compact disk read-only memory (CD-ROM), may include program codes, and may run on a terminal device such as a personal computer. However, the program product of the present disclosure is not limited thereto. In this document, the readable storage medium can be any tangible medium that contains or stores a program, and the program can be used by or in combination with an instruction execution system, apparatus, or device.

The program product can use any combination of one or more readable media. The readable medium may be a readable signal medium or a readable storage medium. The readable storage medium may be, for example, but not limited to, an electrical, magnetic, optical, electromagnetic, infrared, or semi-conductive system, apparatus, or device, or any combination thereof. More specific examples (non-exhaustive list) of the readable storage medium include: electrical connections with one or more wires, portable disks, hard disks, random access memories (RAMs), read-only memories (ROMs), erasable programmable read-only memory (EPROMs or flash memories), optical disks, portable compact disk read-only memories (CD-ROMs), optical storage devices, magnetic storage devices, or any suitable combination thereof.

The computer-readable signal medium may include a data signal propagated in baseband or as a part of a carrier wave, and carries readable program codes therein. The propagated data signal can be in many forms, including but not limited to electromagnetic signals, optical signals, or any suitable combination thereof. The readable signal medium may also be any readable medium other than a readable storage medium, and the readable medium can transmit, propagate, or transfer programs used by or in combination with an instruction execution system, apparatus, or device.

The program codes contained in the readable medium can be transmitted by any suitable medium, including but not limited to wireless, wired, optical cable, RF, etc., or any suitable combination thereof.

The program codes used to perform the operations of the present disclosure can be written in any combination of one or more programming languages. The programming languages include object-oriented programming languages such as Java, C++, etc., as well as conventional procedural programming language such as "C" language or a similar programming language. The program codes can be executed entirely on a user computing device, executed partly on a user device, executed as a standalone software package, executed partly on the user computing device and partly on a remote computing device, or executed entirely on the remote computing device or on a server. In the case of a remote computing device, the remote computing device can be connected to a user computing device through any kind of network, including a local area network (LAN) or a wide area network (WAN), or can be connected (for example, connected via the internet provided by an internet service provider) to an external computing device.

In an exemplary embodiment of the present disclosure, an electronic device capable of implementing any of the above methods is also provided.

Those skilled in the art can understand that any of various aspects of the present disclosure can be implemented as a system, a method, or a program product. Therefore, any of various aspects of the present disclosure can be specifically implemented in any of the following forms, namely: a complete hardware implementation, a complete software implementation (including firmware, microcode, etc.), or a combination of hardware aspect and software aspect implementation, all of which may be collectively referred to herein as a "circuit", "module" or "system".

The electronic device 800 according to such an embodiment of the present disclosure will be described below with reference to FIG. 8. The electronic device 800 shown in FIG. 8 is only an example, and should not bring any limitation to the functions and scope of use of the embodiments of the present disclosure.

Figure 8:
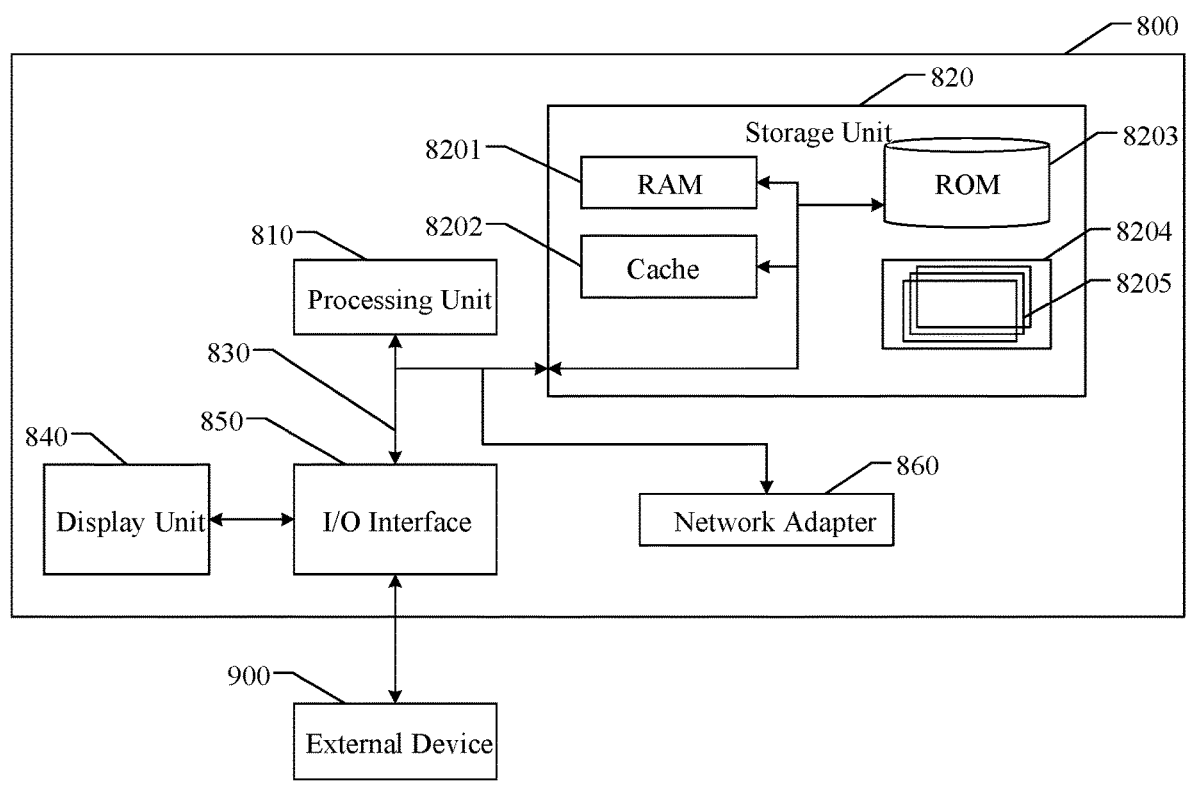
FIG. 8 is a schematic block diagram of an electronic device according to an exemplary embodiment of the present disclosure.

As illustrated in FIG. 8, the electronic device 800 is represented in the form of a general-purpose computing device. Components of the electronic device 800 may include, but are not limited to: at least one processing unit 810 described above, at least one storage unit 820 described above, a bus 830 configured to connect different system components (including the storage unit 820 and the processing unit 810), and a display unit 840.

The storage unit stores program codes, and the program codes can be executed by the processing unit 810 to cause the processing unit 810 to perform the steps of the "exemplary method" described above in this specification according to the various exemplary embodiments of the present disclosure. For example, the processing unit 810 may perform step 102 to step 110 as illustrated in FIG. 1 and/or may perform step 202 to step 212 as illustrated in FIG. 2.

The storage unit 820 may include a readable medium in the form of a transitory storage unit, such as a random access storage unit (RAM) 8201 and/or a cache unit 8202, and may further include a read-only storage unit (ROM) 8203.

The storage unit 820 may further include a program/utility tool 8204 having a set of program modules 8205, i.e., at least one program module 8205. Such program module 8205 includes but is not limited to: an operating system, one or more application programs, other program modules, and program data. Each or some combination of these examples may include the implementation of a network environment.

The bus 830 may include one or more of several types of bus structures, including a storage unit bus, a storage unit controller, a peripheral bus, a graphics acceleration port, a processing unit, or a local area bus using any of multiple bus structures.

The electronic device 800 may also communicate with one or more external devices 900 (such as keyboards, pointing devices, Bluetooth devices, etc.), and may also communicate with one or more devices that enable a user to interact with the electronic device 800, and/or communicate with any device (e.g., a router, a modem, etc.) that enables the electronic device 800 to communicate with one or more other computing devices. Such a communication can be performed through an input/output (I/O) interface 850. In addition, the electronic device 800 may also communicate with one or more networks (for example, a local area network (LAN), a wide area network (WAN), and/or a public network, such as the Internet) through a network adapter 860. As illustrated in the figure, the network adapter 860 communicates with other modules of the electronic device 800 through the bus 830. It should be understood that although not illustrated in the figure, other hardware and/or software modules can be used in conjunction with the electronic device 800, including but not limited to: microcodes, device drivers, redundant processing units, external disk drive arrays, Redundant Array of Independent Disk (RAID) systems, tape drives and data backup storage system, etc.

Through the description of the above embodiments, those skilled in the art can easily understand that the exemplary embodiments described herein can be implemented by software or a combination of software with necessary hardware. Therefore, the technical solutions according to the embodiments of the present disclosure can be embodied in the form of a software product which can be stored in a non-transitory storage medium (which can be a CD-ROM, U disk, mobile hard disk, etc.) or on the network, and include several instructions to cause a computing device (which can be a personal computer, a server, a terminal device, or a network device, etc.) to perform the method according to any of the embodiments of the present disclosure.

In addition, the above-mentioned figures are merely schematic illustrations of the processing included in the method according to any of the exemplary embodiments of the present disclosure, and are not intended for limitation. It is easy to understand that the processing illustrated in the above figures does not indicate or limit the time sequence of these processing. In addition, it is easy to understand that these processing can be executed, for example, synchronously or asynchronously in multiple modules.

It should be noted that although several modules or units of the device for action execution are mentioned in the above detailed description, this division is not mandatory. In fact, according to the embodiments of the present disclosure, the features and functions of two or more modules or units described above may be embodied in one module or unit. Conversely, the features and functions of a module or unit described above can be further divided into multiple modules or units to be embodied.

Those skilled in the art will easily conceive of other embodiments of the present disclosure after considering the specification and practicing the disclosure disclosed herein. This application is intended to cover any variations, uses, or adaptive changes of the present disclosure, and these variations, uses, or adaptive changes follow the general principles of the present disclosure and include common knowledge or customary technical means in the technical field that are not disclosed in the present disclosure. The description and the embodiments are only regarded as exemplary, and the true scope and spirit of the present disclosure are indicated by the claims.

It should be understood that the present disclosure is not limited to the precise structure that has been described above and shown in the figures, and various modifications and changes can be made without departing from its scope. The scope of the present disclosure is only limited by the appended claims.

What is claimed is:

1. A virtual object processing method, comprising:
   detecting a spatial plane in a scene where a first device is located;
   detecting real objects in the scene to determine a plurality of real object position boxes;
   determining a candidate position box set from the plurality of real object position boxes based on a matching relation between the plurality of real object position boxes and the spatial plane in the scene;
   determining, in response to a virtual object configuration operation for a target position box in the candidate position box set, position information of a virtual object in the target position box; and
   transmitting information on the virtual object and the position information of the virtual object in the target position box to a second device for displaying the virtual object on the second device.

2. The virtual object processing method according to claim 1, wherein said detecting the spatial plane in the scene where the first device is located comprises:
   extracting feature points of the scene based on a plurality of video frame images and corresponding inertial information that are collected by the first device;
   constructing a feature point cloud based on the extracted feature points; and
   detecting the spatial plane in the scene where the first device is located by use of the feature point cloud.

3. The virtual object processing method according to claim 2, wherein said detecting the real objects in the scene to determine the plurality of real object position boxes comprises:
   determining a target frame image, inputting the target frame image into a trained machine learning model, and determining the plurality of real object position boxes by use of the trained machine learning model.

4. The virtual object processing method according to claim 2, wherein said determining the candidate position box set from the plurality of real object position boxes based on the matching relation between the plurality of real object position boxes and the spatial plane in the scene comprises:
  determining, for any one real object position box of the plurality of real object position boxes, a plurality of feature position points of the real object position box;
  determining coordinate points and normal directions of the plurality of feature position points in a coordinate system of the feature point cloud; and
  determining the real object position box as a candidate position box and adding the real object position box to the candidate position box set, when projections of the coordinate points of the plurality of feature position points in the coordinate system of the feature point cloud along the respective normal directions are all on a same spatial plane.

5. The virtual object processing method according to claim 1, further comprising, subsequent to said determining the position information of the virtual object in the target position box:
  determining three-dimensional position information of the virtual object in the scene based on the position information of the virtual object in the target position box; and
  displaying the virtual object on the first device based on the three-dimensional position information of the virtual object in the scene.

6. A virtual object processing method, comprising:
  detecting a spatial plane in a scene where a second device is located;
  detecting real objects in the scene to determine a plurality of real object position boxes;
  determining a candidate position box set from the plurality of real object position boxes based on a matching relation between the plurality of real object position boxes and the spatial plane in the scene;
  obtaining information on a virtual object and position information of the virtual object in a target position box of a first device that are transmitted by the first device;
  determining, in response to a virtual object configuration operation, a virtual object placement box from the candidate position box set; and
  determining, based on the position information of the virtual object in the target position box of the first device, position information of the virtual object in the virtual object placement box for displaying the virtual object on the second device.

7. The virtual object processing method according to claim 6, wherein said detecting the spatial plane in the scene where the second device is located comprises:
  extracting feature points of the scene based on a plurality of video frame images and corresponding inertial information that are collected by the second device;
  constructing a feature point cloud based on the extracted feature points; and
  detecting the spatial plane in the scene where the second device is located by use of the feature point cloud.

8. The virtual object processing method according to claim 7, wherein said detecting the real objects in the scene to determine the plurality of real object position boxes comprises:
  determining a target frame image, inputting the target frame image into a trained machine learning model, and determining the plurality of real object position boxes by use of the trained machine learning model.

9. The virtual object processing method according to claim 7, wherein said determining the candidate position box set from the plurality of real object position boxes based on the matching relation between the plurality of real object position boxes and the spatial plane in the scene comprises:
  determining, for any one real object position box of the plurality of real object position boxes, a plurality of feature position points of the real object position box;
  determining coordinate points and normal directions of the plurality of feature position points in a coordinate system of the feature point cloud; and
  determining the real object position box as a candidate position box and adding the real object position box to the candidate position box set, when projections of the coordinate points of the plurality of feature position points in the coordinate system of the feature point cloud along the respective normal directions are all on a same spatial plane.

10. The virtual object processing method according to claim 6, wherein said determining, based on the position information of the virtual object in the target position box of the first device, the position information of the virtual object in the virtual object placement box comprises:
  determining a size ratio between the target position box and the virtual object placement box; and
  performing a zooming processing on the position information of the virtual object in the target position box of the first device based on the size ratio, and determining a result of the zooming processing as the position information of the virtual object in the virtual object placement box.

11. The virtual object processing method according to claim 10, wherein said displaying the virtual object on the second device comprises:
  determining three-dimensional position information of the virtual object in the scene based on the position information of the virtual object in the virtual object placement box; and
  displaying the virtual object on the second device based on the three-dimensional position information of the virtual object in the scene.

12. The virtual object processing method according to claim 11, further comprising, subsequent to said displaying the virtual object on the second device:
  transmitting, in response to an interaction operation on the virtual object, data of the interaction operation to the first device for displaying an image corresponding to the interaction operation on the first device.

13. A virtual object processing apparatus, comprising:
  a memory configured to store a computer program, and
  a processor configured to invoke and execute the computer program stored in the memory to:
  detect a spatial plane in a scene where a first device is located;
  detect real objects in the scene to determine a plurality of real object position boxes;
  determine a candidate position box set from the plurality of real object position boxes based on a matching relation between the plurality of real object position boxes and the spatial plane in the scene;
  determine position information of a virtual object in the target position box in response to a virtual object configuration operation for a target position box in the candidate position box set; and
  transmit information on the virtual object and the position information of the virtual object in the target position box to a second device for displaying the virtual object on the second device.

14. The virtual object processing apparatus according to claim 13, wherein the processor is further configured to invoke and execute the computer program stored in the memory to:
- extract feature points of the scene based on a plurality of video frame images and corresponding inertial information that are collected by the first device,
- construct a feature point cloud based on the extracted feature points, and
- detect the spatial plane in the scene where the first device is located by use of the feature point cloud.

15. The virtual object processing apparatus according to claim 14, wherein the processor is further configured to invoke and execute the computer program stored in the memory to:
- determine a target frame image,
- input the target frame image into a trained machine learning model, and
- determine the plurality of real object position boxes by use of the trained machine learning model.

16. The virtual object processing apparatus according to claim 14, wherein the processor is further configured to invoke and execute the computer program stored in the memory to:
- determine, for any one real object position box of the plurality of real object position boxes, a plurality of feature position points of the real object position box,
- determine coordinate points and normal directions of the plurality of feature position points in a coordinate system of the feature point cloud, and
- determine the real object position box as a candidate position box and add the real object position box to the candidate position box set, when projections of the coordinate points of the plurality of feature position points in the coordinate system of the feature point cloud along the respective normal directions are all on a same spatial plane.

17. The virtual object processing apparatus according to claim 13, the processor is further configured to invoke and execute the computer program stored in the memory to:
- determine three-dimensional position information of the virtual object in the scene based on the position information of the virtual object in the target position box; and
- display the virtual object on the first device based on the three-dimensional position information of the virtual object in the scene.

18. A virtual object processing apparatus, comprising:
a memory configured to store a computer program, and
a processor configured to invoke and execute the computer program stored in the memory to perform the virtual object processing method according to claim 6.

19. A non-transitory computer readable storage medium having a computer program stored thereon, wherein the computer program, when executed by a processor, implements the virtual object processing method according to claim 1.

20. An electronic device, comprising:
a processor; and
a memory configured to store executable instructions of the processor;
wherein the processor is configured to execute the executable instructions to perform the virtual object processing method according to claim 1.

* * * * *